March 21, 1939. C. F. BIERBACH 2,150,906
DIRECTION INDICATING DEVICE FOR MOTOR VEHICLES
Filed March 2, 1937 2 Sheets-Sheet 2
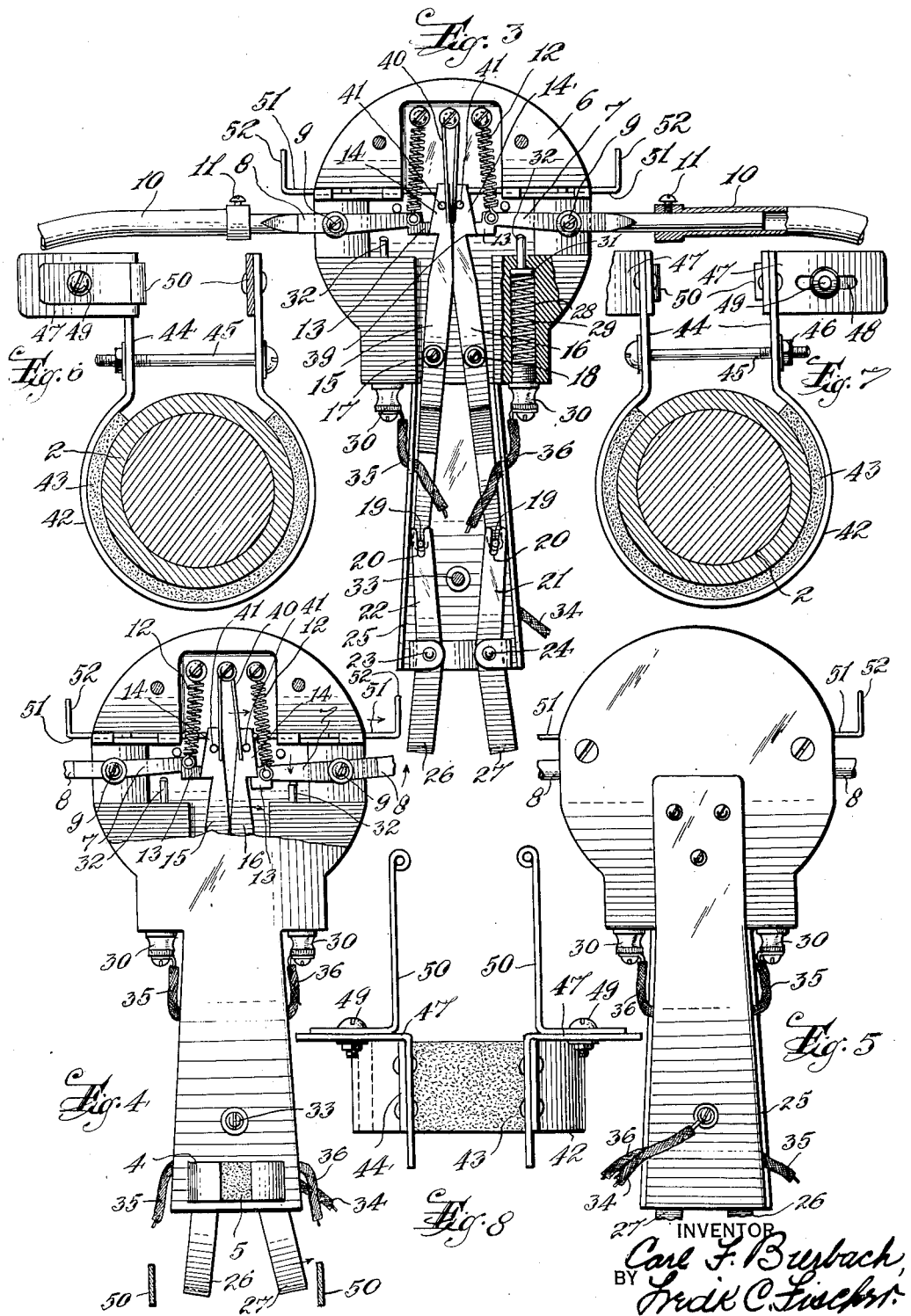
INVENTOR
Carl F. Bierbach,
BY Fredk C. Fischer
ATTORNEY

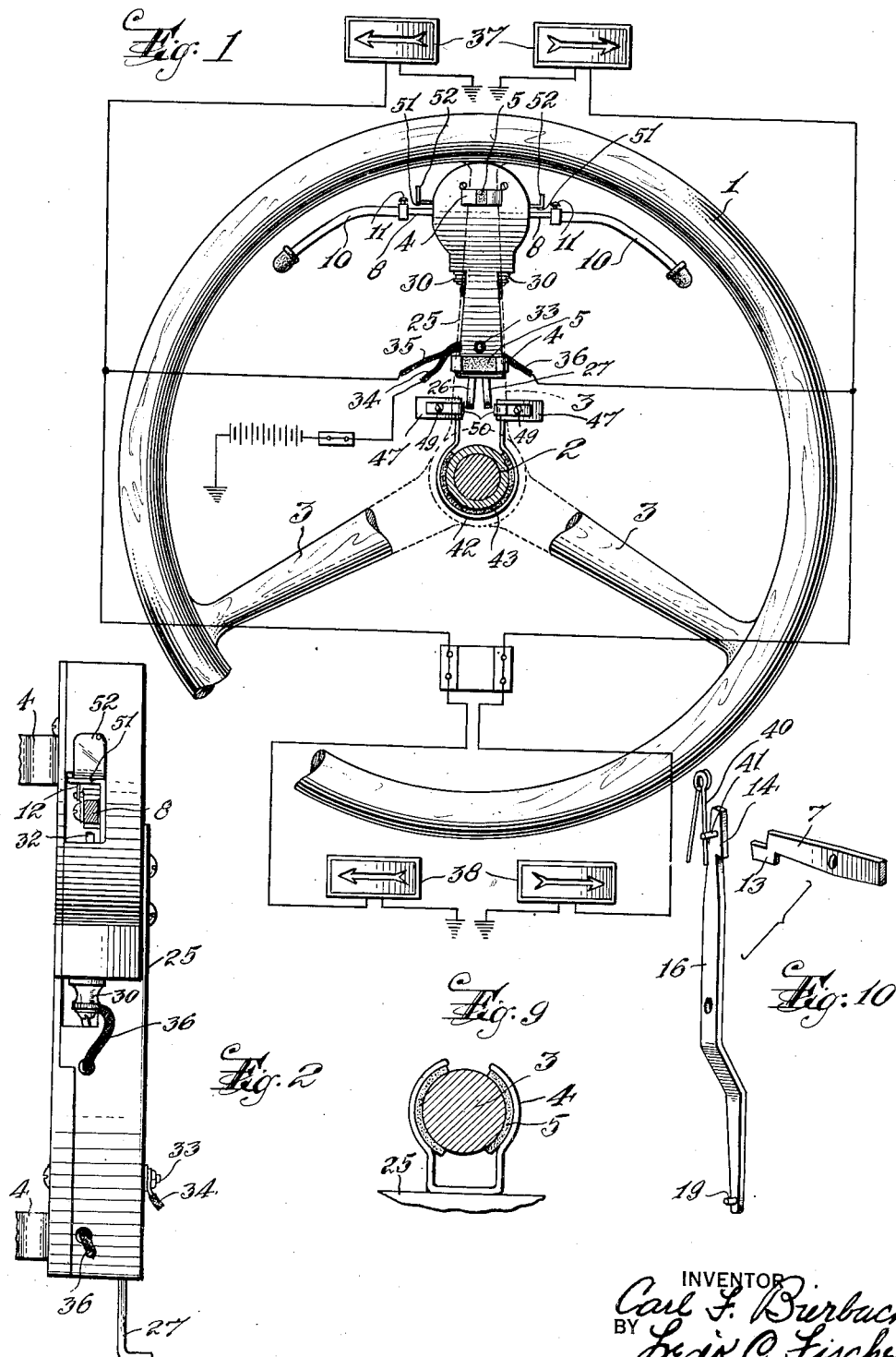

Patented Mar. 21, 1939

2,150,906

UNITED STATES PATENT OFFICE

2,150,906

DIRECTION INDICATING DEVICE FOR MOTOR VEHICLES

Carl F. Bierbach, Newark, N. J., assignor of thirty per cent to Joseph F. Malley, and thirty per cent to George Massom, both of Newark, N. J.

Application March 2, 1937, Serial No. 128,621

4 Claims. (Cl. 200—59)

This invention relates to signalling devices for motor vehicles and more particularly to improvements in devices for indicating the direction in which a motor vehicle is to be turned.

The present-day tendency toward the use of closed automobiles renders it difficult and inconvenient for the driver of such a motor vehicle to indicate to drivers in the rear thereof the direction in which the vehicle is to be turned. This is especially so in the winter time when it is necessary to keep the windows closed.

It is, therefore, an object of this invention to provide a device positioned adjacent the steering wheel within easy reach of the driver of the motor vehicle, for indicating the direction in which the vehicle is to be turned. The device is preferably mounted on the steering wheel and on the steering post and provided with extensible arms to enable it to be readily and conveniently manipulated by the fingers of the driver without necessitating the removal of the hands from the steering wheel.

A further object is the provision of a direction indicating device for motor vehicles, which device is simple in structure and positive in operation, so that it will not readily get out of order, no matter how frequently it may be used.

A further object is the provision in a direction indicating device for motor vehicles, of means for automatically returning the parts of the device to a neutral position after the motor vehicle has made the desired turn as indicated by the device.

These and other advantageous objects, which will later appear are accomplished by the simple and practical construction and arrangement of parts hereinafter described and exhibited in the accompanying drawings, forming part hereof, and in which:

Fig. 1 is a plan view of a steering wheel having a direction indicating device embodying my invention mounted thereon, this figure also including a diagram of the electrical circuit employed in connection with the device, Fig. 2 is a side elevational view of the device, Fig. 3 is a plan view of a direction indicating device with the cover therefor removed, the operating parts of the device being shown in a neutral position, that is, no turns are to be indicated.

Fig. 4 is a plan view of the device showing the position of parts thereof for indicating a left turn, Fig. 5 is a plan view of the upper side of the device showing clips by means of which it can be attached to a spoke of a steering wheel, Fig. 6 is a top plan view of a collar mounted on a steering post and forming a part of the direction indicating device, Fig. 7 is a bottom plan view of the collar shown in Fig. 6, Fig. 8 is an elevational view of the collar shown in Fig. 6, Fig. 9 is an elevational view of one of the clamps attached to the cover of the indicating device for supporting the device from a spoke of a steering wheel, and Fig. 10 is a perspective view of elements used in the device.

Referring to the drawings, in Fig. 1 there is shown a steering wheel 1 mounted upon a steering post 2. One of the spokes 3 of the steering wheel is encircled by a pair of clamps 4, the latter being insulated from the spoke by means of insulating material 5, (see Fig. 9). The clamps 4 are mounted on the upper cover of the indicating device as shown in Fig. 1.

Referring to Fig. 3 the indicating device is shown to include a head 6 made of insulating material which head is provided with recesses in which are positioned operating parts of the device. One recess which traverses the head 6 has pivoted therein by means of pivot pins 9 a pair of levers 7 and 8, which levers are telescoped within handle members 10 and fixed thereto by means of set screws 11, so that the handles can be adjusted to various positions relative to the rim of the steering wheel. As shown in Fig. 3, the levers 7 and 8 are normally held in a raised position by means of tension springs 12. The inner ends of the levers are inclined and when the device is in a neutral position, that is, the position in which no indication is made, the inner ends 13 of the levers 7 and 8 engage inclined portions 14 of a pair of levers 15 and 16, pivoted at 17 and 18 to the head 6. The opposite ends of the levers 15 and 16 are provided with a pin 19 which are positioned in slots 20 in the ends of a pair of levers 21 and 22 pivoted at 23 and 24 to a metal casing 25, which is supported by the head 6. The levers 21 and 22 have portions 26 and 27 extending out of the casing for a purpose hereinafter described.

The head 6 is provided with a pair of recesses 28 in which are positioned compression springs 29 having one end thereof engaging terminals 30. The other end of the springs 29 bear against heads 31 integral with pins 32 which project outwardly to positions adjacent the levers 7 and 8. The levers are, as above stated, normally prevented from engaging the pins 32 by the spring 12.

Mounted in the metal casing 25 between the levers 21 and 22 is a metal stud 33 which is connected by means of a cable 34 to a terminal of a storage battery or other source of electrical current. The terminals 30 are connected by cables 35 and 36 (see Fig. 1) to direction indicating lights 37 at the front of the motor car and direction indicating lights 38 at the rear of the vehicle, said indicating lights being grounded as shown in the diagram of Fig. 1.

In operation, when it is desired to indicate a turn in a certain direction, say for example to the right, (see Fig. 3) the lever 7 is moved downwardly so that the inclined tip 13 thereof moves off of the inclined surface 14 of lever 16 where it is held in a notch 39. When in this position, the lever 7 will engage the pin 32, and a bowed spring 40 mounted in the head 6 and engaging pins 41 on the levers 15 and 16 will cause the upward end of lever 16 to move clockwise, which movement causes the lever 21 to move counter-clockwise against the stud 33.

Inasmuch as the stud 33 is metallic and the casing 25 is made of metal, as well as the levers 21 and 16 and 7, and the pin 32, etc. it will be seen that an electrical circuit is then made through the stud 33 to the lever 21, then to lever 16 and to lever 7, and then to pin 32, through the spring 29 to the terminal 30 from which the current is conducted by means of cables 36 to the direction indicators at the front and rear of the vehicle to indicate a right turn.

The position of the levers to indicate a right turn is shown in Fig. 4.

Mounted on the steering post adjacent the indicating device is a collar 42 which is insulated from the steering post by insulating material 43, said collar having spring arms 44 which are held tightly against the post by means of a bolt and nut 45 and 46. The spring arms 44 have mounted thereon angles 47 provided with slots 48 which receive set screws 49 for adjustably holding upstanding arms 50 in various positions of adjustment. The arms 50 are positioned so that they are adjacent the arms 26 and 27 of levers 22 and 21. When the indicating device is in a neutral position, that is, when it is not desired to indicate the turn, the arms 26 and 27 will not engage the arms 50. However, when the indicating device has been moved to indicate a turn, as above described, the arm 27 will be swung (see Fig. 3 and Fig. 4) to the right, and inasmuch as the steering column is stationary, while the steering wheel is moved to make the turn, the arm 27 will engage an arm 50 which will exert pressure against the arm 27 to move the arm 27 in a clockwise direction, which action moves the lever 16 counter-clockwise, so that the tip 13 will be disengaged from the notch 39 and be restored to its neutral position by the spring 12 as shown in Fig. 3.

At certain times, a person may move one of the levers 7 or 8 to indicate a turn, but before making the turn change his mind and decide to not make the turn. Since he does not make the turn, the arms 50 will not exert pressure upon the arms 26 and 27 and accordingly the indicator will remain lighted. In order to move the device to a neutral position as shown in Fig. 3 there is provided in the head 6, sliding bars 51 having finger-pieces 52, the inner ends of the bars bearing against the upper ends of levers 16 and 15.

Referring to Fig. 4, it will be seen that by sliding the right-hand bar 51 inwardly, the lever 16 will be moved counter-clockwise so that the end 13 of lever 7 will be disengaged from the notch 39, and the lever 7 returned to its neutral position.

From the above description it will be seen that I have provided a simple and positively operating device for indicating the direction in which a motor vehicle is being turned. The device obviously is so arranged that it will not get out of order and will be always in a condition for positive operation.

The foregoing disclosure is to be regarded as descriptive and illustrative only, and not as restrictive or limitative of the invention, of which obviously embodiments may be constructed including many modifications, without departing from the spirit and scope of the invention set forth in the appended claims.

Having thus described my invention, what I claim as new and desire to secure by Letters Patent is:

1. In a switch device a head of insulating material adapted to be attached to the spoke of a steering wheel of a motor vehicle, a lever pivoted in said head and having a notch in one end thereof, spring means tending normally to rotate said lever clockwise, a hand operable lever pivoted in said head and having a portion adapted to be received in said notch, said head having a recess in which is positioned a compression spring, a terminal engaging one end of said spring, a pin engaging the other end of said spring and projecting upwardly to a position adjacent the hand operable lever, spring means for normally maintaining said hand operable lever from engagement with said pin, and means for applying electric current to said first mentioned levers so that when the end of the hand operable lever rests in said notch current will be conveyed through the hand operable lever to the pin and spring and to said terminal, all of said levers being made of an electrical conducting material.

2. In a switch device a head of insulating material adapted to be attached to the spoke of a steering wheel of a motor vehicle, a lever pivoted in said head and having a notch in one end thereof, spring means tending normally to rotate said lever clockwise, a hand operable lever pivoted in said head and having a portion adapted to be received in said notch, said head having a recess in which is positioned a compression spring, a terminal engaging one end of said spring, a pin engaging the other end of said spring and projecting upwardly to a position adjacent the hand operable lever, spring means for normally maintaining said hand operable lever from engagement with said spring, and means for applying electric current to said first mentionel levers so that when the end of the hand operable lever rests in said notch current will be conveyed through the hand operable lever to the pin and spring and to said terminal, all of said levers being made of an electrical conducting material, and means associated with said first mentioned levers to restore said levers to a neutral position after a turn has been made.

3. In a switch device a head of insulating material adapted to be attached to the spoke of a steering wheel of a motor vehicle, a first pair of levers pivoted in said head and having notches in one end thereof, spring means tending normally to rotate said levers in opposite directions, hand operable levers pivoted in said head and having portions adapted to be received in said notches, terminals mounted on said head, means for applying electric current to said first mentioned levers, and means for electrically connecting said hand operable levers to said terminals when the hand operable levers are moved so that their ends are positioned in said notches, a pair of spaced arms mounted on the steering post for the steering wheel, a pair of second levers having a lost motion connection with said first mentioned levers and arranged to engage said arms so that when the steering wheel is rotated to make a turn one of said second mentioned levers will engage one of said arms to rotate one of said first mentioned levers to restore said levers to a neutral position after a turn has been made.

4. In a switch device, a head of insulating material adapted to be mounted on a steering wheel of a motor vehicle, a first pair of levers pivoted in said head and having notches in one end thereof, means tending normally to rotate said levers in opposite directions, hand operable levers pivoted in said head and having portions adapted to be received in said notches, terminals mounted on said head, means for applying electric current to said first mentioned levers, means for electrically connecting said hand operable levers to said terminals when the hand operable levers are moved so that their ends are positioned in said notches, a pair of spaced arms mounted on the steering post for the steering wheel, a second pair of levers having lost motion connection with said first mentioned levers and arranged to engage said arms so that when the steering wheel is rotated to make a turn one of said second mentioned levers will engage one of said arms to rotate one of said first mentioned levers, to restore said levers to a neutral position after a turn has been made.

CARL F. BIERBACH.